May 1, 1962 W. L. MEIER ETAL 3,032,657
COMPOSITE SCINTILLATION CRYSTAL
Filed June 16, 1959

WILBER L. MEIER
DON A. HARVEY
INVENTORS

BY Ralph E. Bitner
ATTORNEY

United States Patent Office 3,032,657
Patented May 1, 1962

3,032,657
COMPOSITE SCINTILLATION CRYSTAL
Wilber L. Meier, Chatham, and Don A. Harvey, North Arlington, N.J., assignors to National Radiac, Inc., Newark, N.J., a corporation
Filed June 16, 1959, Ser. No. 820,801
5 Claims. (Cl. 250—71)

This invention relates to a composite scintillation crystal formed of a plurality of rods, each in a light-tight container and arranged to produce light when bombarded by penetrating radiation. The light flashers are transmitted to either one of the ends of the rod where the light may be applied to a light sensitive receiver or recorder. The invention also relates to a composite scintillation crystal which includes two groups of rods, one group arranged to transmit light in one direction and the other group arranged to transmit light in a different direction, generally at an angle of 90 degrees to the first group.

Scintillation crystals have been employed in many forms and in many types of sensitive detectors for observing the presence of penetrating radiation. This radiation may include alpha, beta, high energy particles, gamma radiation, neutrons, and cosmic rays. High energy protons may be detected if their energy is high enough to penetrate the light-tight holder of the material.

One difficulty in using scintillation crystals is that it is almost impossible to determine the direction of the penetrating radiation. The present invention can be employed with many types of light receivers such as photographic plates, photoelectric cells, photomultipliers, the human eye, and many other types of light sensitive devices including an intensifier.

Throughout the specification and claims the term "penetrating radiation" is assumed to include alpha, beta, high energy particles, gamma radiation, neutrons, cosmic rays, and high speed protrons. Also, in the specification and claims the term "transparent" includes any type of transparent or translucent crystal body which is capable of transmitting light from any portion of a rod of the material to the end of the rod where it may be picked up and received by a light collecting device.

The composite scintillation crystal herein described includes means for plotting the path of a high energy particle in three dimensions and determines the point of entry into the crystal and its position of exit from the crystal or the position where it is absorbed by the crystal material.

One of the objects of this invention is to provide an improved composite scintillation crystal which avoids one or more of the disadvantages and limitations of prior art crystals.

Another object of the invention is to confine the light emitted by penetrating radiation so that it may be observed or recorded in a small area by a photosensitive device.

Another object of the invention is to track the path of a high energy particle which may traverse several components of the scintillation crystal arrangement.

Another object of the invention is to provide a composite scintillation crystal which transmits light flashes in two directions, generally at right angles to each other, and thereby allows the plotting or viewing of a path of a high energy particle in three dimensions.

The invention includes a composite scintillation crystal comprising a holder which includes a plurality of extended containers in parallel array. Each container is filled with a rod of transparent scintillation material which emits light when bombarded by penetrating radiation. The crystal holder is made of material which is opaque to light but the ends of the rods are exposed and are generally formed in a plane which is substantially perpendicular to the length of the rods. A photosensitive detector, light amplifier, or light recorder is employed to record the light flashes as transmitted through the ends of the rods.

One feature of the invention includes two groups of rods enclosed in metallic or other containers. Each group includes a plurality of containers in a parallel array in a single plane. The holder is made up of alternate layers selected from each of said groups. Two light sensitive devices are employed with each of the groups to record or observe the path of a high energy particle in three dimensions.

For a better understanding of the present invention, together with other and further objects thereof, reference is made to the following description taken in connection with the accompanying drawings.

Figure 1:
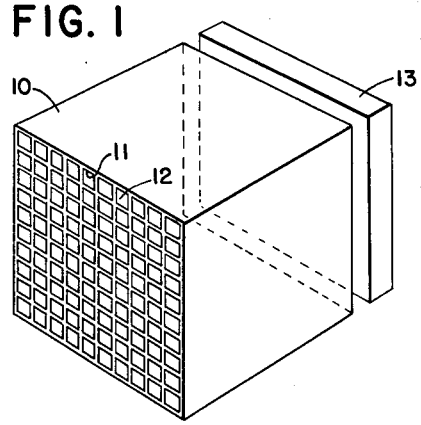
FIG. 1 is a perspective drawing of a composite scintillation crystal mounted adjacent to a light sensitive device shown in block form. The crystal includes rods having a substantially square cross section.

Referring now to the drawings, the scintillation crystal shown in FIG. 1 includes a crystal holder 10 having a generally cube-like shape and formed with a plurality of extended containers 11, each traversing one dimension of the holder and formed generally with a square cross section. The holder 10 may be constructed of a metallic material such as aluminum or beryllium or it may be made of any type of plastic as long as the plastic material is opaque to light. Each container 11 is filled with a rod of transparent or translucent scintillation material 12. This material is formed with a considerable percentage of fluorescent powders, such as zinc sulphide, which gives off light when bombarded by penetrating radiation. The rods 12 extend for the entire depth of the crystal holder and when any one of them is activated by penetrating radiation of any type it produces a flash of light which is contained within its walls and the light is transmitted to the open face of the crystal holder where it may be picked up by a photosensitive device 13 by which the light flashes may be observed or recorded. Such a device may be a photographic plate, an image intensifier, a series of photosensitive cells connected to a recording device, or the device may be the human eye which observes the light flashes when it is not necessary to record them permanently.

Figure 2:
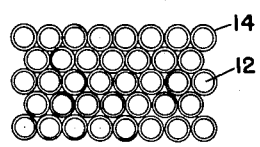
FIG. 2 is an end view of a portion of a composite scintillation crystal made up of cylindrical tubes.

The containers which hold the scintillation rods may be of any desired shape and when the holder is assembled by collecting a large number of individual containers such as the cylindrical containers 14 shown in FIG. 2. Such an arrangement of hollow tubes may be collected within a box-like container and then a liquid scintillation material poured into the tube openings. After the scintillation material has been hardened, the open faces of the rod may be polished to facilitate light transmission and the solid block may now be employed in the same manner as the block shown in FIG. 1.

Figure 3:
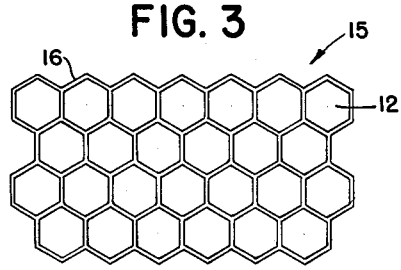
FIG. 3 is an end view of a portion of a composite scintillation crystal (greatly enlarged) showing a honeycomb type of crystal rods, each having six sides.

The honeycomb arrangement 15 shown in FIG. 3 includes an integral one-piece metal frame 16 and is perhaps the most efficient arrangement of scintillation rods since it is impossible for any particle to traverse such an array without striking scintillating material. Such an arrangement of containers may be formed by metal casting or plastic molding.

Figure 4:
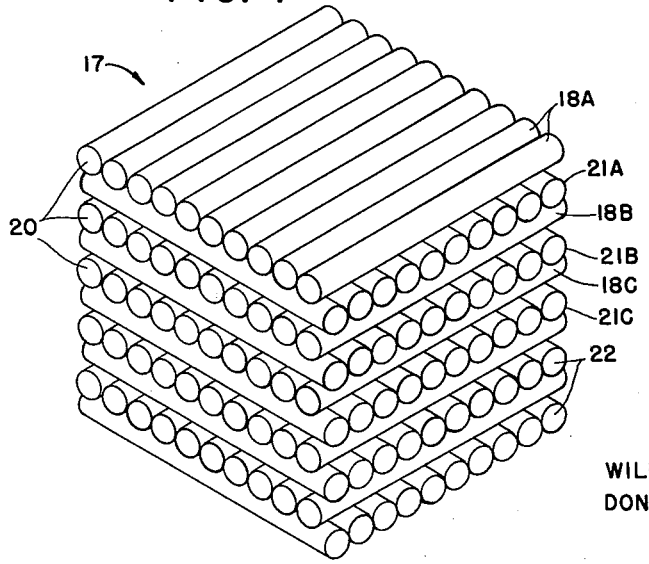
FIG. 4 is a composite scintillation crystal which may be used for determining the path of a high speed particle in three dimensions and includes two groups of layers, each having containers with their axes aligned 90 degrees with each other.

The crystals shown in FIGS. 1, 2, and 3, may be used to detect and observe the path of high speed particles in two dimensions. If it is desired to track a particle in three dimensions the arrangement shown in FIG. 4 is used. This composite crystal 17 includes a first group of crystal containers 18a, 18b, 18c, all directed in one common direction and all having end faces 20 which can be mounted adjacent to a first photosensitive device for recording or observation. The crystal also includes a second group of layers 21A, 21B, etc., which include layers of containers mounted parallel to each other, similar to containers 18 but having a common direction which is at an angle to the first group. The second group of containers 21 is formed with faces 22 which are generally in a single plane and are directed to a second photosensitive device. If the two photosensitive devices are photographic emulsions, these records may be developed and later shown in a viewing device by which an observer may see the illusion of three dimensional space and observe the path of a particle in three dimensions. It is obvious that the cylinders shown in FIG. 4 may have other cross sectional shapes, such as the square shown in FIG. 1, the circles shown in FIG. 2, or the six-sided polygons shown in FIG. 3.

Since the light flashes are segregated and generally appear in several adjacent rods to denote the passage of a particle, the intensity of the flash (as recorded on a photographic emulsion) can be used to identify the nature of the particle and to distinguish between different kinds of particles and radiation.

While a solid scintillation crystal is by far the most convenient to handle and to use, it is obvious that such a container may be employed with liquid scintillation materials or even with fluorescent gases. It is also obvious that, where a high degree of refinement is desired, the cross sectional area of the rods may be reduced to very small dimensions and many thousands of rods used in a single crystal.

The foregoing disclosure and drawings are merely illustrative of the principles of this invention and are not to be interpreted in a limiting sense. The only limitations are to be determined from the scope of the appended claims.

We claim:

1. A composite scintillation crystal comprising, a crystal holder including a plurality of extended containers each filled with a rod of transparent scintillation material which emits light when bombarded by penetrating radiation, said containers arranged in layers each having a plurality of containers in parallel array in a single plane, a first group of said layers having containers aligned in a common direction, a second group of layers having containers aligned in a second common direction disposed at an angle of more than ten degrees with the containers in the first group, said holders made up of alternate layers selected from each of said groups, the ends of said rods in each group formed in a plane substantially perpendicular to the length of the rods, and a light sensitive plate positioned adjacent to the ends of the rods in each group for exposure by the light generated in the rods.

2. A scintillation crystal as set forth in claim 1 wherein the angle between containers in the first and second groups is substantially ninety degrees.

3. A scintillation crystal as set forth in claim 1 wherein all of said containers are permanently joined in a single unit.

4. A scintillation crystal as set forth in claim 1 wherein all of said containers are formed with straight axes.

5. A composite scintillation crystal comprising, a crystal holder including a plurality of extended containers in parallel array, said holders made of a material opaque to light but adapted to pass penetrating radiation, each of said containers filled with a rod of transparent scintillation material which emits light when bombarded by penetrating radiation, each of said rods adapted for selective transmission of light to one end thereof, said containers arranged in layers each having a plurality of containers in a single plane, a first group of said said layers having containers aligned in a common direction and terminating adjacent to a first viewing plane, a second group of said layers having containers aligned in a common direction and terminating adjacent to a second viewing plane, the common directions of said first and second groups disposed at an angle of greater than ten degrees, said holder made up of alternate layers selected from each of said groups, and a photosensitive emulsion disposed in each of said viewing planes for recording the presence and intensity of light flashes occurring within said containers.

References Cited in the file of this patent

UNITED STATES PATENTS

| | | |
|---|---|---|
| 2,666,145 | Eversole | Jan. 12, 1954 |
| 2,725,484 | McKee | Nov. 29, 1955 |
| 2,733,355 | McKee | Jan. 31, 1956 |
| 2,764,693 | Jacobs et al. | Sept. 25, 1956 |
| 2,772,368 | Scherbatskoy | Nov. 27, 1956 |
| 2,829,264 | Garrison | Apr. 1, 1958 |
| 2,829,266 | Bessen | Apr. 1, 1958 |
| 2,830,184 | Scherbatskoy | Apr. 8, 1958 |
| 2,881,324 | Scherbatskoy | Apr. 7, 1959 |